United States Patent [19]

Hacke et al.

[11] 4,393,395

[45] Jul. 12, 1983

[54] BALANCED MODULATOR WITH FEEDBACK STABILIZATION OF CARRIER BALANCE

[75] Inventors: Joseph F. Hacke, Blackwood; Lucas J. Bazin, Vincentown, both of N.J.

[73] Assignee: RCA Corporation, New York, N.Y.

[21] Appl. No.: 300,226

[22] Filed: Sep. 8, 1981

[30] Foreign Application Priority Data

Jan. 26, 1981 [GB] United Kingdom ............... 8102283

[51] Int. Cl.³ .............................................. H04N 9/50
[52] U.S. Cl. .................................................. 358/23
[58] Field of Search ................... 358/23, 24, 160, 186; 332/44

[56] References Cited

U.S. PATENT DOCUMENTS

| | | | |
|---|---|---|---|
| 2,793,348 | 5/1957 | Hunter | 358/24 |
| 2,799,829 | 7/1957 | Gordon et al. | 332/47 |
| 3,146,302 | 8/1964 | Moore . | |
| 3,721,755 | 3/1973 | Craig | 358/23 |
| 4,354,200 | 10/1982 | Haenen et al. | 358/23 |

Primary Examiner—Richard Murray
Attorney, Agent, or Firm—E. M. Whitacre; W. H. Meise

[57] ABSTRACT

A balanced modulator or mixer is used for modulating components of a chrominance signal onto a subcarrier to generate double-sideband suppressed-carrier amplitude-modulated signals. The video component is applied to a phase splitter which produces two antiphase baseband video signals, which in turn are applied to modulator switches driven in antiphase at the carrier rate for producing the DSB SC signal at a common output terminal. For reducing residual carrier output resulting from unbalance of the video during black level, a sample-and-hold circuit is coupled to each output of the phase splitter and is gated during black level. A differential amplifier compares the sampled signals and reduces the unbalance in a feedback manner to eliminate residual subcarrier during black level.

11 Claims, 3 Drawing Figures

BALANCED MODULATOR WITH FEEDBACK STABILIZATION OF CARRIER BALANCE

Standard NTSC composite color television signals include a baseband luminance component extending above 3 MHz resulting from horizontal scanning at 15,734 Hz horizontally and 60 Hz vertically. The luminance spectrum is clustered about multiples of the horizontal scanning frequency. NTSC standards provide for a chrominance signal including I and Q components amplitude-modulated onto a carrier at a frequency of 455 times half the line frequency which for NTSC is approximately 3.58 MHz. Each of the I and Q signals are amplitude-modulated so as to produce a suppressed-carrier-double-sideband-signal. The modulated I signal is 90° out-of-phase with the modulated Q signal. The two modulated chrominance signals are summed together and with the luminance signal, with the result that the chrominance signals are interleaved between the spectral peaks of the luminance signal. In PAL systems, the corresponding chrominance signals are U and V.

Normally, the amplitude-modulation of each chrominance component is accomplished by means of a balanced mixer or modulator. Such modulators are normally operated so that at black level, a level at which no chrominance is present, the chrominance subcarrier and sidebands go to zero amplitude. Normally, such modulators are provided with adjustments or controls by which each half of the symmetrical modulator structure may be made identical to the other half so as to achieve true balance and substantially zero output carrier when the input video signal is representative of a black level. Such controls are undesirable, in that adjustable components are expensive, and tend to be more sensitive to environmental conditions such as temperature than are fixed components, they are liable to misalignment by unskilled maintenance personnel, and in the case of portable equipment as for example portable television cameras, adjustable elements are bulkier than fixed elements and also more sensitive to mechanical shock which may cause misalignment. Furthermore, adjustable components are required to be accessible for maintenance purposes, which further complicates the design problem in portable equipment. It is desirable to reduce the number of adjustments and in particular it is desirable to eliminate the adjustments required for black balance of a balanced mixer or modulator.

It is known from U.S. Pat. No. 3,721,755 issued Mar. 20, 1973 in the name of Craig to form a balanced mixer from a pair of FETs. In the Craig arrangement, the demodulated video is applied to a paraphase amplifier, and each of the inverse phase outputs of the paraphase amplifier is applied through a buffer amplifier to two field-effect transistors operated as switches or modulators. The modulated output signal is taken from the juncture of the modulator transistors by means of an emitter-follower. Balance is achieved during the black level by a capacitor coupled in the path between one of the buffers and the modulator FET to form an AC-coupled path. A keyed clamp in the form of a further junction field-effect transistor operated in a saturation mode is coupled across the modulator FETs to equalize the voltage across the FETs during the keying interval, which is also the black-level interval. In such a system, the balance is directly dependent upon the characteristics of the clamp switch operated in the saturation mode. Furthermore, the currents drawn by the FET in the saturation mode flow in part into the capacitor, which must be sufficiently large to absorb that portion of the saturation current flowing in the capacitor without significant change in voltage. Furthermore, the capacitor must be sufficiently temperature-stable so that changes in the value of the capacitance do not result in an unwanted change in balance voltage. Such a system is not considered suitable for achieving a specification of 60 dB of carrier balance, which requires an overall balance of better than one part in 1,000 of voltage. It is desirable to provide improved carrier balance without the necessity for manual controls.

SUMMARY OF THE INVENTION

An improved suppressed-carrier balanced modulator for a video signal which includes a black-level interval has a structure including a phase splitter coupled to receive the video signal for producing two out-of-phase signals. Two modulator switches are coupled to the phase splitter and to an output terminal of the modulator for alternately coupling the out-of-phase signals to the output terminal of the modulator at a carrier rate, which creates a carrier which is suppressed by an amount dependent upon the equality of the amplitude of the out-of-phase signals. Inequality of those signals during the black-level interval reduces the carrier suppression. According to the improvement, a sample-and-hold circuit is coupled to each output of the phase splitter for sampling of the out-of-phase signals during the black interval. A differential amplifier is coupled to the sample-and-hold circuits and to the phase splitter for forming a degenerative feedback loop for improving the balance and improving the suppression during black interval.

DESCRIPTION OF THE INVENTION

Figure 1:
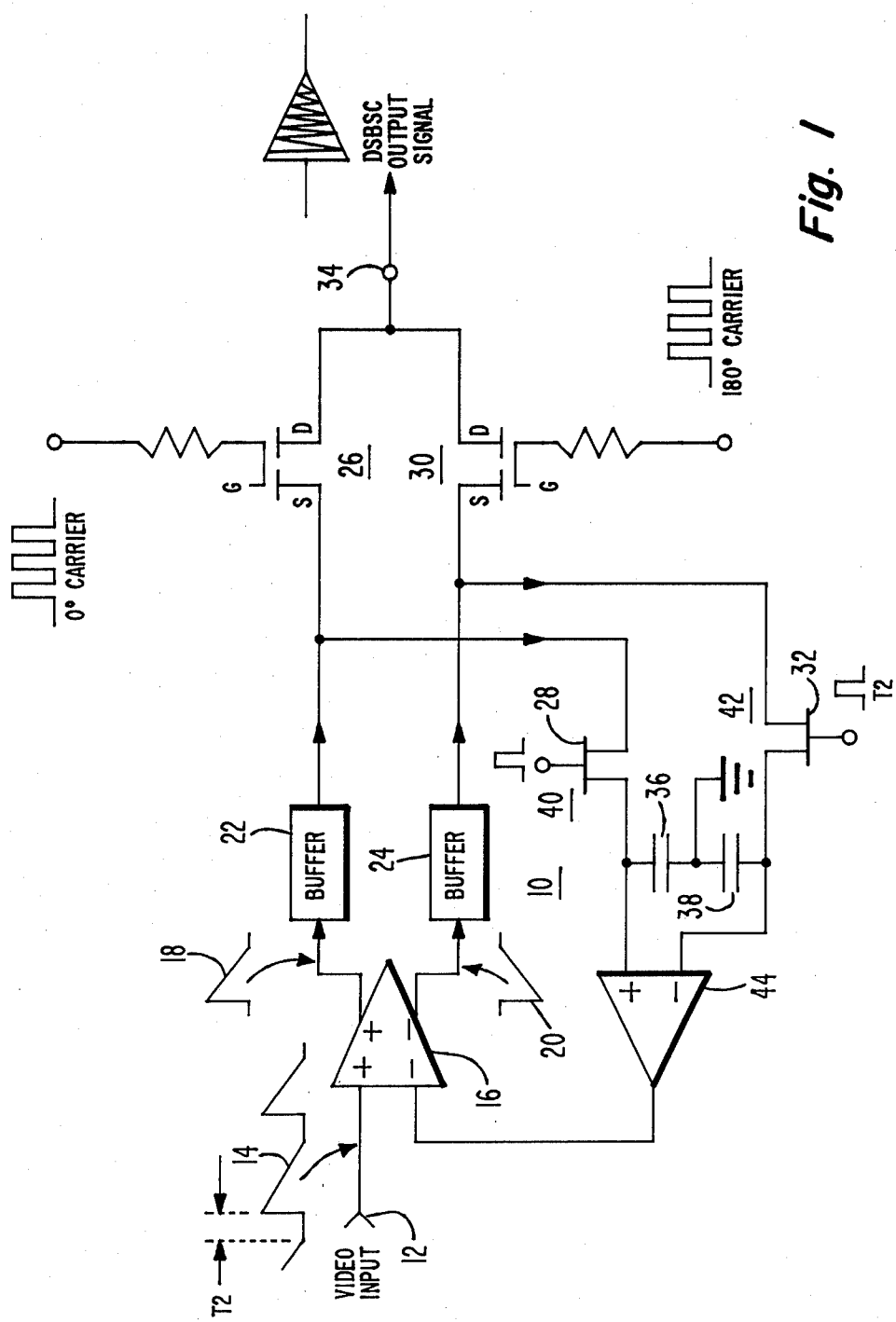
FIG. 1 is a diagram partially in block and partially in schematic form of a modulator embodying the invention.

In FIG. 1, a modulator designated generally as 10 includes an input terminal 12 to which video is applied which may be illustrated as waveform 14. Video waveform 14 includes an interval T2 during which the signal has a value representative of black. The video signal is applied to the non-inverting input terminal of a paraphase amplifier or phase-splitter 16, which produces at first and second output terminals mutually inverse-phase signals shown as 18 and 20. In-phase signal 18 is applied to a buffer illustrated as a block 22 while relatively inverse-phase signal 20 is applied to a buffer illustrated as a block 24. Buffers 22 and 24 present a relatively high impedance to the output terminals of amplifier 16 and a relatively low output impedance to the following circuit.

The output signal from buffer 22 is applied to the source (S) of a modulator field-effect transistor designated generally as 26, and is also applied to one terminal of the main conducting path of a switching or modulator FET 28. The output signal from buffer 24 is applied to the S terminal of a modulator FET 30 and to one terminal of the main current conducting path of a FET 32. The drain (D) terminals of FETs 26 and 30 are coupled together and form an output terminal 34 of the modulator at which the double-sideband suppressed-carrier (DSBSC) output signal is formed. The gate (G) terminal of each of FETs 26 and 30 are coupled by means of a resistor to a source of mutually out-of-phase switching signals recurring at the carrier rate for switching transistors 26 and 30 alternately into conduction for alternately coupling to output terminal 34 the output signals from buffers 22 and 24.

The second terminal of the main current conducting path of FET 28 is coupled to one terminal of a filter capacitor 36, the other end of which is connected to ground. Similarly, the second terminal of the main current conducting path of switching.

FET 32 is coupled to a terminal of a filter capacitor 38, the other terminal of which is connected to ground. The gate terminals of transistors 28 and 32 are coupled to receive gating pulses occurring during black-level interval T2, which gating pulses are generated in known fashion by a gate pulse generator (not shown). When so gated, transistor 28 and capacitor 36 together form a sample-and-hold (SH) circuit designated generally as 40, while transistor 32 and capacitor 38 together form a SH circuit 42. When gated during interval T2, FETs 28 and 32 have a relatively low ON resistance, whereby capacitors 36 and 38 can charge to the value of the out-of-phase signals at the outputs of buffers 22 and 24, respectively. Capacitors 36 and 38 charge during each black interval and do not discharge substantially between intervals, so that after several cycles of operation, very little charge is required to fully charge the capacitors. Consequently, the current required to flow through the main current conductive path or channel of sampling transistors 28 and 32 is very small. Since the current is small, slight differences in the resistance of their channels during the ON interval do not create significant voltage offsets.

In order to further reduce the effects of variations in the ON resistance of FETs 28 and 32, these FETs may be selected in matched pairs or be fabricated as adjacent FETs on a single die. In order to further reduce the effects of imbalance in the sample-and-hold circuits, a differential amplifier 44 has its non-inverting input coupled to the output of SH 40 and its inverting input terminal coupled to the output of SH circuit 42. Differential amplifier 44 generates a control signal indicative of the difference during the black interval between the signals applied to the S terminals of modulator switches 26 and 30. In order to reduce this difference towards zero, the control signal at the output terminal of amplifier 44 is coupled to an inverting input terminal of phase splitter 16 for closing a degenerative feedback loop having relatively high gain by which a very close balance in the video signals applied to the modulator switches is maintained for maintaining carrier balance.

Figure 2:
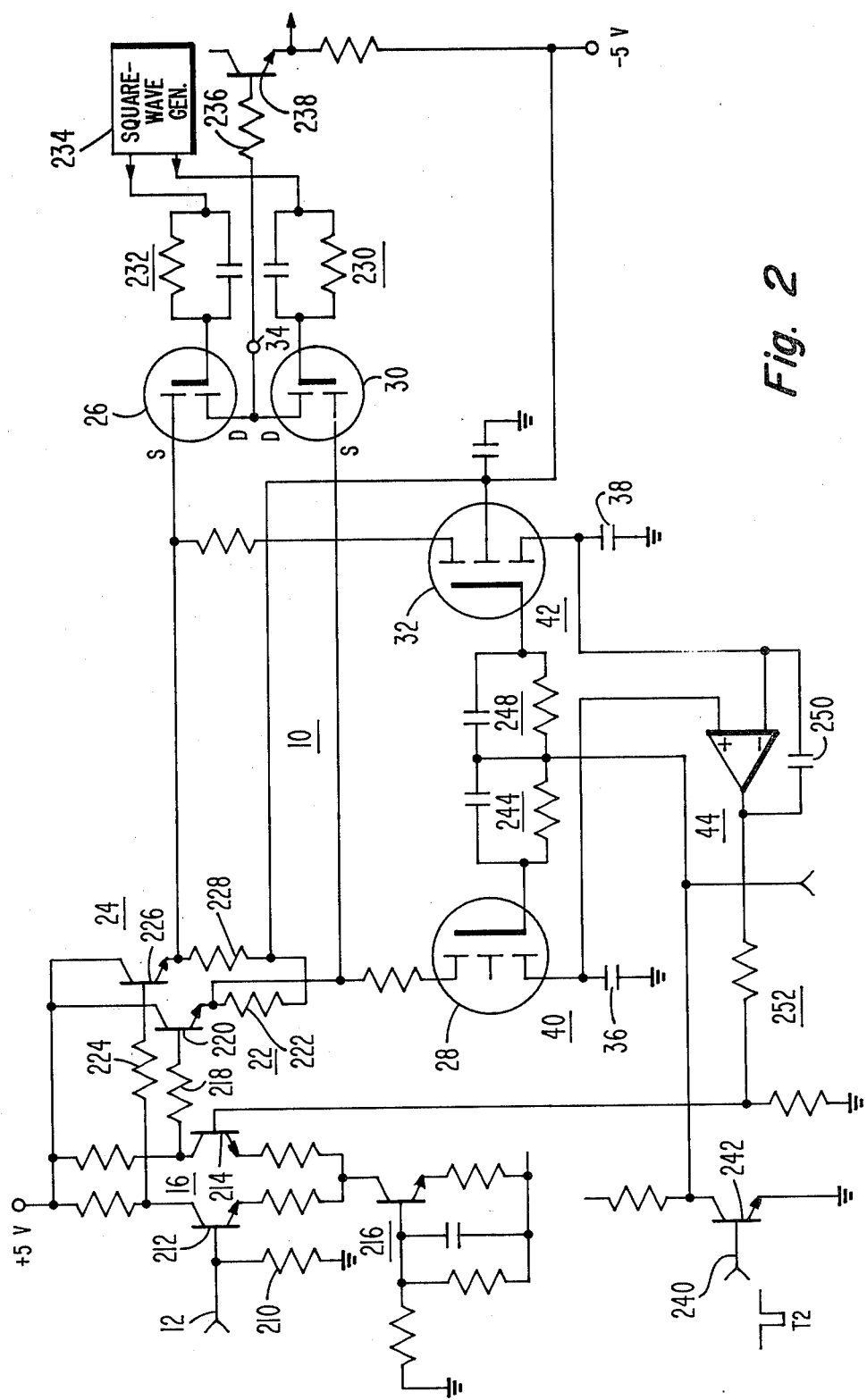
FIG. 2 is a diagram principally in schematic form of the arrangement of FIG. 1.

FIG. 2 illustrates the arrangement of FIG. 1 in greater detail. Elements corresponding to those of FIG. 1 are designated by the same reference numerals. Video applied to input terminal 12 is applied across a resistor 10 to the base of a transistor 212 of paraphase amplifier 16. Amplifier 16 includes a second transistor 214. The emitters of transistors 212 and 214 are coupled by resistors to a current source designated generally as 216. The non-inverting output signal from amplifier 16 is taken from the collector of transistor 214 through a resistor 218 to the base of a transistor 220 of buffer amplifier 22. The emitter of transistor 220 is coupled through a resistor 222 to a −5 V source. The inverting output of amplifier 16 is taken from the collector of transistor 212 through a resistor 224 to the base of a transistor 226 of buffer amplifier 24. The emitter of transistor 226 is coupled via resistor 228 to the −5 V source. Output signals from the emitters of transistors 220 and 226 are applied to the S terminals of modulator transistors 26 and 30. The gate terminals of transistors 26 and 30 are coupled by speed-up circuits to mutually out-of-phase carrier-rate signals produced by a square-wave generator illustrated as a block 234. The D terminals of transistors 26 and 30 are coupled together and by way of an output terminal 34 and a resistor 236 to the base of a transistor 238 coupled as an emitter follower. Gating signals applied to an input terminal 240 at lower left of FIG. 2 are coupled to the base of a transistor 242 coupled as a common-emitter amplifier, the collector of which is coupled by speed-up circuits 244 and 248 to the gates of transistors 28 and 32, respectively. A capacitor 250 is coupled between the output terminal of amplifier 44 and its inverting input terminal thereby forming a Miller integrator circuit which reduces the slew rate of the feedback loop. The output terminal of amplifier 44 is coupled by way of a voltage divider designated generally as 252 to the base of transistor 214, which is the inverting input terminal of amplifier 16.

Figure 3:
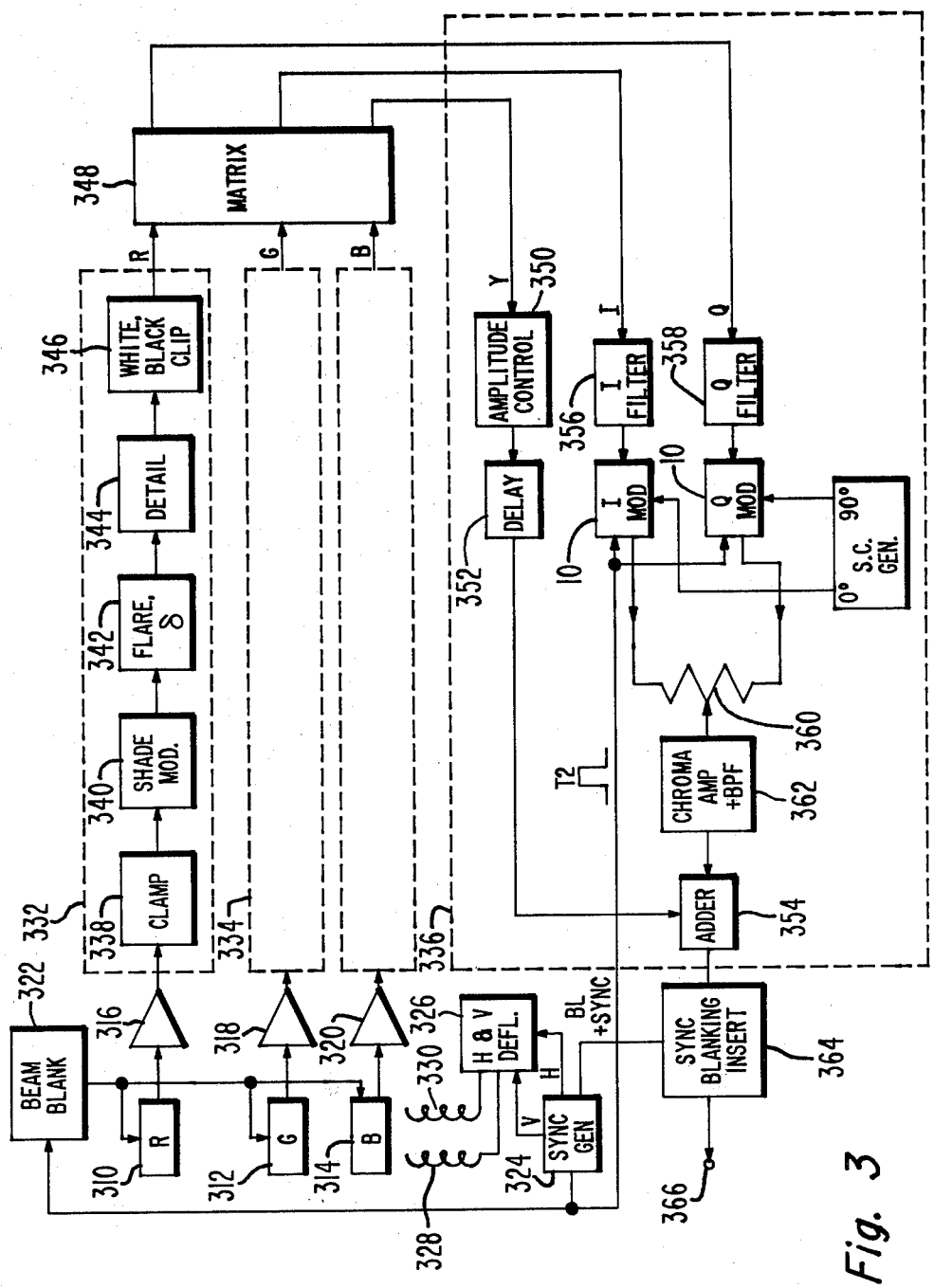
FIG. 3 is a block diagram of a camera embodying modulators of FIG. 1 or 2.

FIG. 3 illustrates a camera in which the modulator arrangement of FIG. 3 is used. In FIG. 3, R, G and B vidicons 310–314 are coupled to video preamplifiers 316, 318 and 320 respectively. The electron beams of vidicons 310–314 are controlled in part by a blanking circuit illustrated as 322 which turns the beams off during the retrace interval under the control of a sync generator 324. Generator 324 also generates horizontal and vertical deflection signals which are applied to horizontal and vertical deflection circuits illustrated as 326 which are coupled to deflection windings illustrated as 328 and 330 which are associated with the vidicons.

The preamplified signals from red, green and blue preamplifiers 316, 318 and 320, respectively, are applied to signal processing circuits 332, 334 and 336 respectively. As the signal processing circuits are identical, only processing circuit 332 is described in detail. The preamplified red signal is applied to a clamp circuit 338 which clamps the black level to a desirable voltage for ease of control in subsequent processing, and the clamped signal is applied in succession to a shading modulator 340 which applies ramp or parabolic signals to the signal for compensating for the characteristics of the vidicon at different portions of the raster. The shaded signal is applied to a flare or gamma circuit 342 in which the curvature of the signal is adjusted in a nonlinear fashion. The gamma-corrected signal is applied to a detail processor 344 which enhances high-frequency transitions and is then applied to a white-and black-level clipping circuit 346 for limiting the excursion of the signal. The processed red signal and corresponding green and blue signals are applied to a matrix 348 which converts the RGB input signals to YIQ signals. The Y component is applied through amplitude control and delay circuits 350–352 to an input of an adder circuit 354. The I signal is applied through a 1.5 MHz low-pass I filter 356 to an I modulator 10 such as that illustrated in FIG. 2. The Q signal is applied through a 0.5 MHz low-pass filter 358 to another modulator 10. Quadrature-related subcarrier signals are applied to the I and Q modulators. I and Q modulators 10 modulate the video onto the subcarriers as is known, and use the T2 pulse from sync generator 24 for controlling carrier balance as described in conjunction with FIGS. 1 and 2. The output signals from I and Q modulators 10 are applied to a balancing circuit including a potentiometer 360 on which the slider can be adjusted to equalize the signal levels. The modulated signals are applied through a chroma amplifier and bandpass filter 362 to a second input of adder 354 where the chrominance signals are combined with the luminance signal. The resulting summed composite color signal is applied through a further sync and blanking insertion circuit illustrated as 364 for generating a composite NTSC signal at an output terminal 366.

What is claimed is:

1. An improved suppressed-carrier balanced modulator for a video signal including a black-level interval comprising:
    a phase splitter coupled to receive the video signal for producing first and second relatively inverse-phase output signals;
    first and second modulator switches coupled to said phase splitter and to an output terminal of the modulator for alternately coupling said first and second inverse-phase output signals to said output terminal of said modulator at a carrier rate for creating a carrier suppressed by an amount dependent upon the equality of the amplitude of said first and second inverse-phase output signals, whereby inequality during the black level interval reduces said suppression;
    wherein the improvement further comprises:
    first and second sample-and-hold circuits, each coupled to said phase splitter for sampling one of said first and second inverse-phase output signals for generating first and second sample signals, respectively, indicative of the value of said first and second inverse-phase signals, respectively, during said black interval;
    differential amplifier means coupled to said first and second sample-and-hold circuits and responsive to the difference between said first and second sample signals for generating a control signal indicative of said difference; and
    coupling means coupled to the output of said differential amplifier means and to said phase splitter for forming a degenerative feedback loop for reducing said difference between said first and second sample signals for improving the equality of the amplitudes of said first and second inverse-phase signals for improving the suppression of said modulator during black intervals.

2. A modulator according to claim 1 wherein each of said sample-and-hold circuits includes a switch coupled to a filter for coupling signal to said filter during said black intervals.

3. A modulator according to claim 2 wherein said filter is a capacitor adapted to charge to the value of said inverse-phase signals during said black intervals.

4. A modulator according to claim 3 wherein said switch is a field-effect transistor.

5. A modulator according to claim 4 wherein said field-effect transistor is an enhancement-mode field-effect transistor having a gate.

6. A modulator according to claim 5 wherein said gate is coupled to a speed-up circuit.

7. A modulator according to claim 6 wherein said speed-up circuit comprises a resistor and a capacitor.

8. A modulator according to claim 1 wherein said feedback loop includes a filter.

9. A modulator according to claim 8 wherein said filter comprises a capacitor coupled to said differential amplifier.

10. A modulator according to claim 9 wherein said capacitor is coupled to the output and inverting input terminals of said differential amplifier for forming a Miller type integrator filter.

11. An improved camera comprising: a source of video signal including black level during a black level interval;
    a phase splitter coupled to receive the video signal for producing first and second relatively inverse-phase output signals;
    first and second modulator switches coupled to said phase splitter and to an output terminal of the modulator for alternately coupling said first and second inverse-phase output signals to said output terminal of said moudlator at a carrier rate for creating a carrier suppressed by an amount dependent upon the equality of the amplitude of said first and second inverse-phase output signals, whereby inequality during the black level interval reduces said suppression;
    wherein the improvement further comprises:
    first and second sample-and-hold circuits, each coupled to said phase splitter for sampling one of said first and second inverse-phase output signals for generating first and second sample signals, respectively, indicative of the value of said first and second inverse-phase signals, respectively, during said black interval; and
    differential amplifier means coupled to said first and second sample-and-hold circuits and responsive to the difference between said first and second sample signals for generating a control signal indicative of said difference; and
    coupling means coupled to the output of said differential amplifier means and to said phase splitter for forming a degenerative feedback loop for reducing said difference between said first and second sample signals for improving the equality of the amplitudes of said first and second inverse-phase signals for improving the suppression of said modulator during black intervals.

* * * * *